United States Patent [19]

Haruna et al.

[11] Patent Number: 4,803,572
[45] Date of Patent: Feb. 7, 1989

[54] RECORDING/REPRODUCING METHOD AND APPARATUS OF MAGNETIC DISK UNIT IN WHICH PLAYBACK COMMENCES BEFORE THE MAGNETIC HEAD IS COMPLETELY CENTERED ON THE TRACK

[75] Inventors: Toshiyuki Haruna, Odawara; Kenji Nishimura, Kanagawa; Yuji Yoshida, Odawara; Kiyotaka Takahashi, Atami; Tsuneo Hirose, Odawara; Katsuhiro Tsuneta, Odawara; Riichi Nakano, Odawara; Kazuto Takahashi, Hadano; Akira Kurano; Tadayuki Ichiba, both of Odawara, all of Japan

[73] Assignees: Hitachi, Ltd.; Hitachi Computer Peripherals Co., Ltd., both of Tokyo, Japan

[21] Appl. No.: 40,126

[22] Filed: Apr. 20, 1987

[30] Foreign Application Priority Data

Apr. 21, 1986 [JP] Japan ................................... 61-89935

[51] Int. Cl.⁴ ......................... G11B 5/55; G11B 15/87
[52] U.S. Cl. .................................. 360/60; 360/78.04; 360/77.06

[58] Field of Search ...................... 360/77, 78, 60, 67, 360/68, 46, 61

[56] References Cited

FOREIGN PATENT DOCUMENTS

57-109151 7/1982 Japan ..................................... 360/77
58-159166 9/1983 Japan .

Primary Examiner—Vincent P. Canney
Assistant Examiner—Kevin Fournier
Attorney, Agent, or Firm—Antonelli, Terry & Wands

[57] ABSTRACT

In a magnetic disk unit for recording/reproducing data onto/from a disc by means of a magnetic head on the basis of a seek command and a recording/reproducing command received from a host processor, the execution of the data reproducing command for the disk is started upon detection of a state that the magnetic head has sought on a desired track to an extent that the centering state is still unstable but the data can be reproduced, and the execution of the data recording command is started upon detection of a condition that the magnetic head has reached the stable centering state on the desired track after the detection of the reproducible state.

10 Claims, 4 Drawing Sheets

RECORDING/REPRODUCING METHOD AND APPARATUS OF MAGNETIC DISK UNIT IN WHICH PLAYBACK COMMENCES BEFORE THE MAGNETIC HEAD IS COMPLETELY CENTERED ON THE TRACK

BACKGROUND OF THE INVENTION

The present invention relates to recording/reproducing control of a magnetic disk unit and relates to a recording/reproducing method and an apparatus of a magnetic disk unit capable of reducing the recording/reproducing process time of data.

When a magnetic disk unit is connected to a host processor and used as a random access file, the access time is comapratively long, i.e., approximately 100 times as compared with the read/write processing. In general, therefore, the magnetic disk unit is not always connected to the host processor, but disconnected from the host processor after the magnetic disk unit has received a command from the host processor via a disk control unit. If the seek command is issued from the host processor, for example, the disk control unit DKC which has received this command controls the magnetic disk unit DKU. In addition, the disk control unit DKC also disconnects itself from the host processor and waits for the operation completion report. When this seek operation has been completed, the disk control unit DKC reports the seek operation completion to the host processor and connects the disk control unit DKC to the host processor again. From the host processor, the disk control unit DKC receives a command specifying a position on the predetermined track for the information to be recorded onto/reproduced from. This position on the track is generally called set sector. Upon receiving a command of this set sector, the disk control unit DKC disconnects itself form the host processor again and directs the magnetic disk unit to search the concerned set sector. After the magnetic disk unit DKU has found the concerned set sector, the disk control unit connects the host processor to the magnetic disk unit again to effect data recording/reproducing operation.

As the procedure for termianting the seek command processing and receiving the command of the set sector, the magnetic disk unit DKU configured as described above does not accept the next command unless the seek command has not been terminated. Therefore, it takes some time from the termination of the seek command processing until the accept of the set sector command. (The average of the seek time is 18 msec, and the average of the set sector processing time is approximately 8.4 msec. That is to say, the seek time is longer than the set sector processing time.) Accordingly, the conventional magnetic disk unit has a problem that the unnecessary command wait time is included in the whole processing time of the recording/reproducing operation.

In order to solve this problem, a technique for rapidly effecting the seek completion report was proposed in JP-A-No. 58-159166 laid open to the public on Sept. 17, 1983. It is now assumed that this technique is used and a magnetic head has approached a desired track. When the movement and positioning speed of the magnetic head has been lowered below a predetermined value, the seek completion report is earlier issued and the head position at the time of seek completion is predictively controlled on the basis of the moving speed without distinction of read/write operation.

The processing in accordance with the above described prior art after the magnetic head has been positioned is carried out on the assumption that a set sector processing command is supplied from the host processor without failure. In actual processing, however, there are cases where data is directly read out into an arbitrary location or an empty sector or data is directly written withotu receiving a processing command from the host processor after the above described seek command. In this case, a gap might be produced between the predicted head position and the desired track. Despite the fact that the magnetic head is not positioned on the desired track, read and write processing commands might be issued from the host processor. Since the recording/reproducing operation is thus attempted at a position other than the desired track, there is a posibility that a read error or a write error is caused.

SUMMARY OF THE INVENTION

An object of the present invention is to provide a recording and reproducing method and an apparatus for a disk unit requiring a seek operation such as a magnetic disk unit (optical disk unit) which has been enhanced in throughput of the data read/write processing.

Another object of the present invention is to provide a recording and reproducing method and an apparatus for a disk unit in which the track deviation can be limited to a predetermined range and a data read/write error can be prevented.

In the present invention, the read and write processing is directly carried out even if the set sector processing and the search processing are carried out like the case where the sector is not specified. The invention is based on the finding that the read processing can be executed more surely than the write processing even if the magnetic head is slightly unstable, i.e., even if the positions of the concerned track and the magnetic head are deviated from the center of the track. Thus, the completion of the positioning (centering) of the magnetic head is reported to the host processor with the readable/write inhibit area and the readable/writable area being clearly distinguished. The host processor is capable of executing the read processing earlier in resspone to the centering completion report. Accordingly, the processing time as a whole can be shortened. As a result, the throughput of the disk unit can be increased.

In accordance with one feature of the present invention, the apparatus is provided with detection means for detecting during the execution of the seek command such a state that the magnetic head has become able to marginally read out the data from the desired track, i.e., the magnetic head has reached the readable area, and control means for, upon detection of the approach of the magnetic head (the approach of the on track) by the above described detection means, judging whether the next command from the processing unit is the read command or the write command, for executing the read operation immediately in case of the read command, and for effecting the write operation after the magnetic head has stabilized on the desired track in case of the write command.

The above described detecting means may detect the state that the magnetic head is located near the desired track by monitoring the position indication voltage representing the degree of centering detected from the magnetic head (or sevo head). Otherwise, the detection means may presume the stabilization state in temporal ways by using a timer.

After the magnetic head has reached the desired track for the magnetic head to be positioned thereon, the magnetic head vibrates in the repetition of overshoots and undershoots. Thereafter, the magnetic head is positioned at the center of the track, i.e., the magnetic head increasingly undergoes the centering. These overshoots and undershoots decrease with time. when the overshoots and undershoots have decreased to a predetermined value preceding the stabilization, the data can be read out.

When the absolute value of the position indication voltage supplied from the magnetic head (servo head) has become below the first predetermined value or when it is detected by the timer that a predetermined time has elapsed, the above described detection means directs the control means to detect it. In response to the detection, the control means judges what processing the next command specifies. When the next command specifies the read operation, the control means immediately executes the read operation. In case of the write processing, the control means executes the data write operation when the absolute value of the position indication voltage has become below the second predetermined voltage which is smaller than the second predetermined value or when the second predetermined time has elapsed.

As a result, the read processing can be executed even if there remain overshoots or undershoots and the occurrence of an error in the write operation can be prevented.

DESCRIPTION OF THE PREFERRED EMBODIMENTS

Embodiments of the present invention will now be described in detail by referring to the drawings. At first, the first embodiment in which the time is monitored by the detection means will not be described by referring to FIG. 1.

Figure 1:
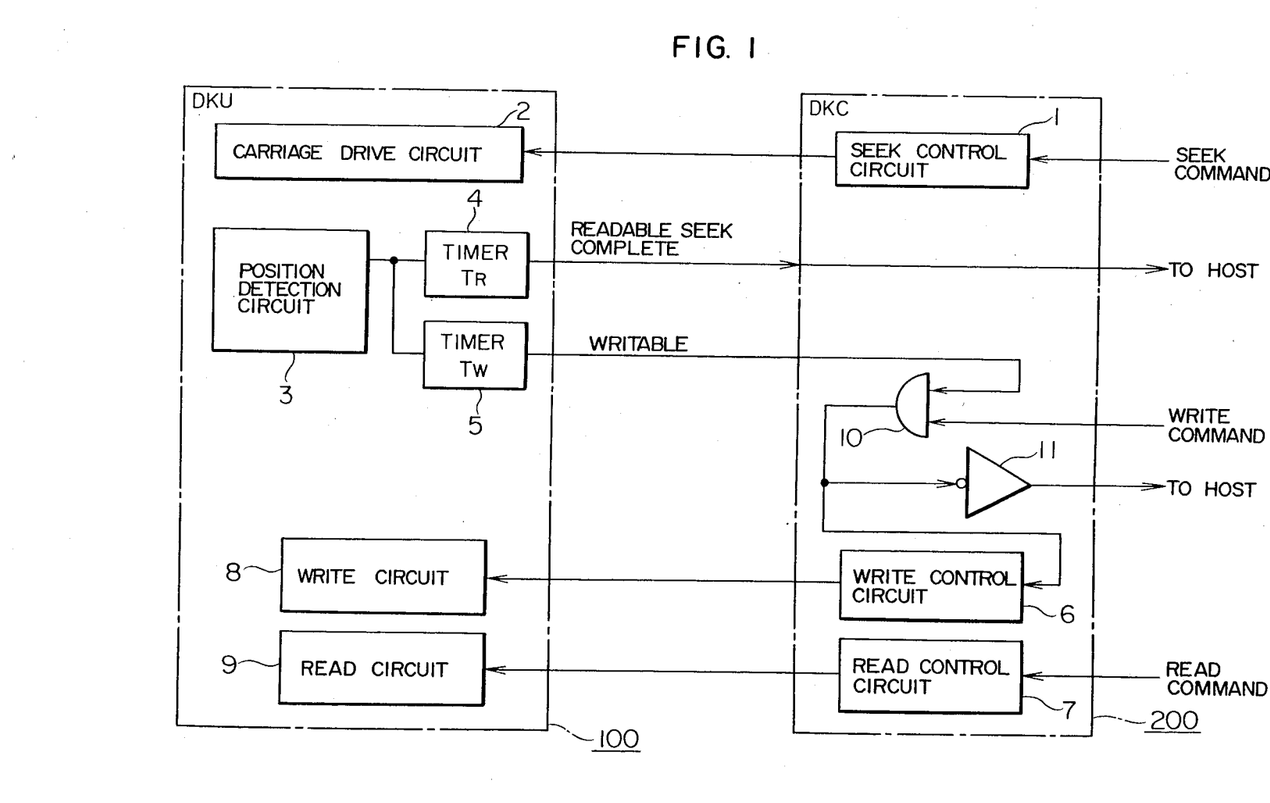
FIG. 1 is a block diagram for illustrating the system configuration of a magnetic disk unit according to the first embodiment of the present invention.

In FIG. 1, numerals 100 and 200 denote a disk unit (DKU) and a disk control unit (DKC), respectively. The HOST Denotes a processing unit serving as a high rank unit.

The seek command from the HOST is supplied to a carriage drive circuit 2 in the DKU 100 via a seek control circuit 1 in the DKU 200.

Figure 2A:
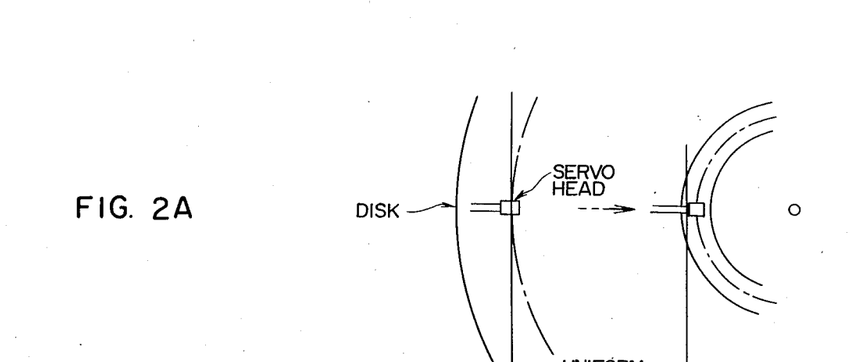
FIGS. 2A to 2E are head operation diagrams and time charts for illustrating the principle of the present invention.
Figure 2B:
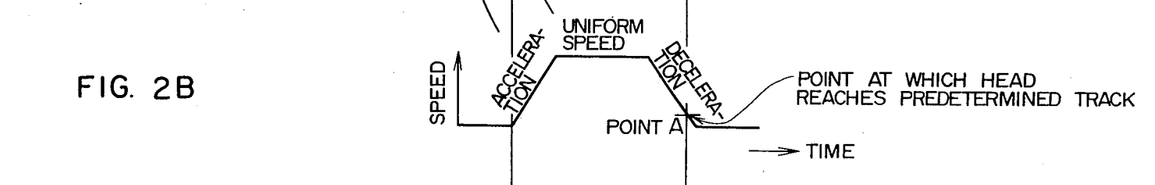

The DKU 100 includes a position detection circuit 3 for detecting the fact that the magnetic head has reached the specified track, and timers 4 and 5. The instants at which these circuits operates are shown in time charts of FIGS. 2B, 2D and 2E. The time Ts in FIG. 2C denotes a wait time taken until the position signal has completely stabilized.

The read command sent from the HOST is supplied to a read circuit 9 in the DKU 100 via a read control circuit 7 in the DKC 200. The write command is supplied to an AND Circuit 10 included in the DKC 200 together with the output of the timer 5 sent from the DKU 100. The output of the AND Circuit 10 is supplied to a write circuit 8 included in the DKU 100 via a write control circuit 6. The output of the AND Circuit 10 is reported to the HOST via an inverter 11. The seek command supplied from the HOST is translated into a carriage movement command specifying the movement amount, the movement direction and the like of the carriage by a seek control circuit 1 of the DKU 200. The result of the translation is supplied to a carriage drive circuit 2 of the DKU 100. On the basis of this carriage movement command, the DKU 100 moves the carriage. When the magnetic head attached to the carriage has reached the desired track, a position detection circuit 3 is activated to cause timers 4 and 5 to start the time counting. This timing is represented by a point A of FIG. 2B.

Figures 2C, 2D:
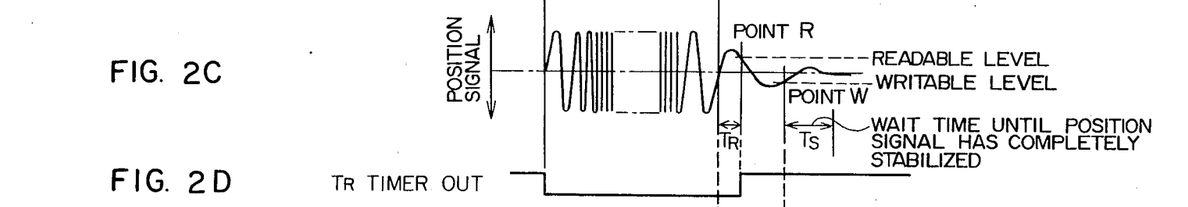

After the magnetic head has reached the desired track, the magnetic head respectively overshoots and undershoots with respect to the center of the desired track as shown in FIG. 2C. The overshoots and undershoots decay with time and finally settle down. The magnetic head is thus positioned at the center of the concerned track. The positioning operation of the head after the point A has been reached is called linear control following the seek control.

Figure 2E:
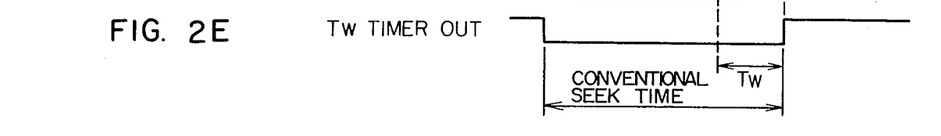

On the other hand, times $T_R$ and $T_W$ were so set in the $T_R$ timer 4 and the $T_W$ timer 5 beforehand that expressions $T_R=1$–$2$ msec and $T_W=2$–$3$ msec may be satisfied, for example. These timers are activated at the point A. And output signals of the $T_R$ timer 4 and the $T_W$ timer 5 turn to logical "1" respectively at points R and W as shown in FIGS. 2D and 2E. As for the overshoot amount of the magnetic head at this time, the point R represents the level at which the write processing is impossible but the read processing is possible. That is to say, the point R represents the positioning of the read/write head which allows the read operation. The point W represent the level at which both the read processing and the write processing are possible. The level ratio of the position signal between the points W and R is approximately ⅓. The point R corresponds to a position within a margin of 4µ forming an error range with respect to one-side width 15µ of the desired track.

The output of the $T_R$ timer 4 is reported to the HOST as the seek complete signal. The HOST issues the read command/write command.

The read command is unconditionally sent to the read circuit 9 in the DKU 100 via the read control circuit 7 in the DKC 200 to execute the read operation.

The write command undergoes AND operation in the DKC 200 together with the output signal of the $T_W$ timer 5 supplied from the DKU, namely, the writable signal. If the AND output is present, the write command is sent to the write circuit 8 of the DKU 100 via the write control circuit 6 to execute the write operation. The time $T_S$ of FIG. 2C represents the wait time taken until the position signal has completely stabilized (i.e., the complete centering has been achieved). Depending upon the object, the write command is executed after the wait time. The wait time is 1 to 2 msec, for example When the AND condition is not satisfied, i.e., the output signal of the $T_W$ timer 5 is logical "0", the operation of the write control circuit 6 of the DKC 200 is inhibited. When the output signal of the timer 5 has turned to logical "1" due to time elapse, an inverter 11 functioning repetitively directs the reexecution of the write operation.

In the usual processing, the seek operation is carried out and thereafter a desired record is looked for while the read processing is effected. After the record has agreed, the write processing is started. However, there is little probability that the desired record arrives immediately after the seek operation. The time for waiting the rotation is thus caused. Therefore, there are few cases where the above described write operation is reexecuted. As a result, the delay of the processing time caused by the reexecution is negligible.

In accordance with the present embodiment, the write processing is executed after the overshoot and undershoot of the magnetic head have decreased in the same way as the usual case. Therefore, write errors are not caused by a shift in the position of the magnetic head. Unlike the conventional case, however, the read processing is executed even during the decay of the overshoot and undershoot of the magnetic head. Accordingly, the stabilization time for the magnetic head positioning can be saved. As a result, the processing speed of the disk read/write operation can be improved.

Figure 3:
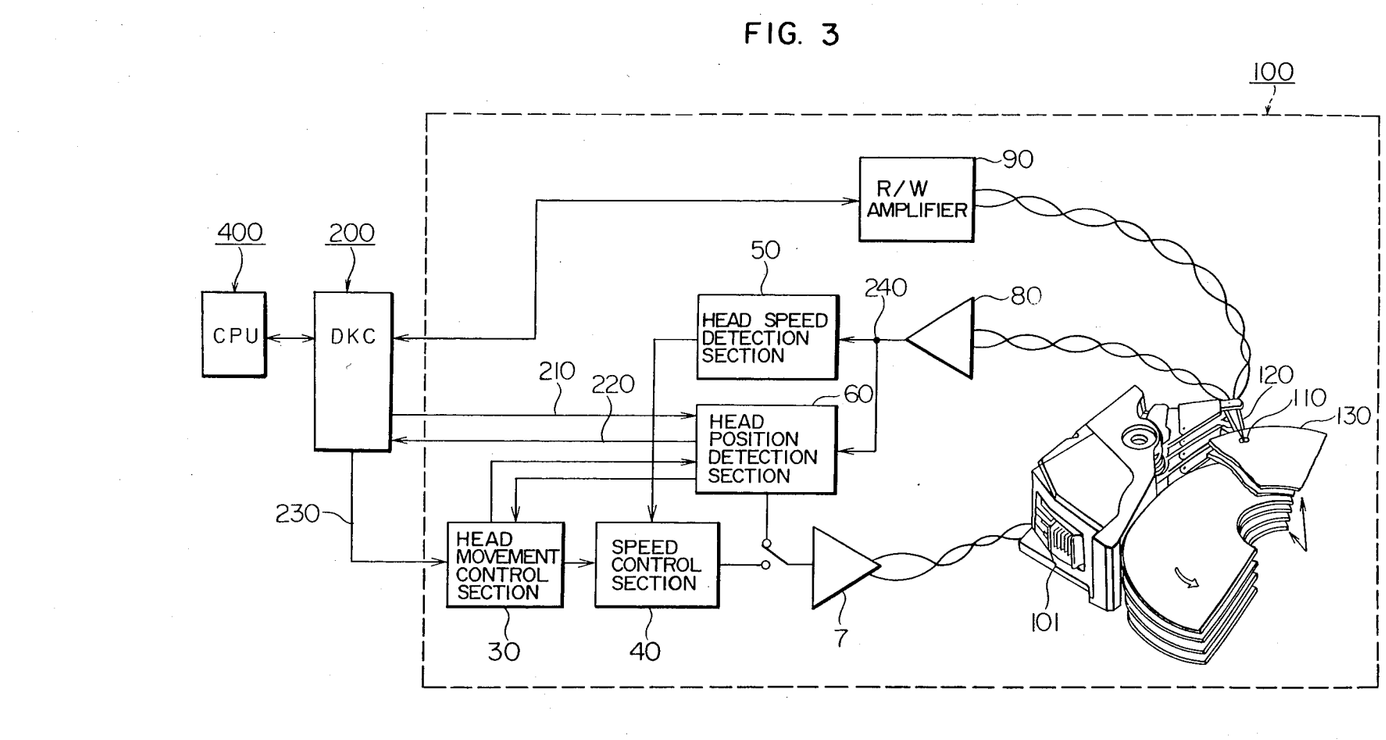
FIG. 3 is a system configuration diagram of the second embodiment of the present invention.
Figure 4:
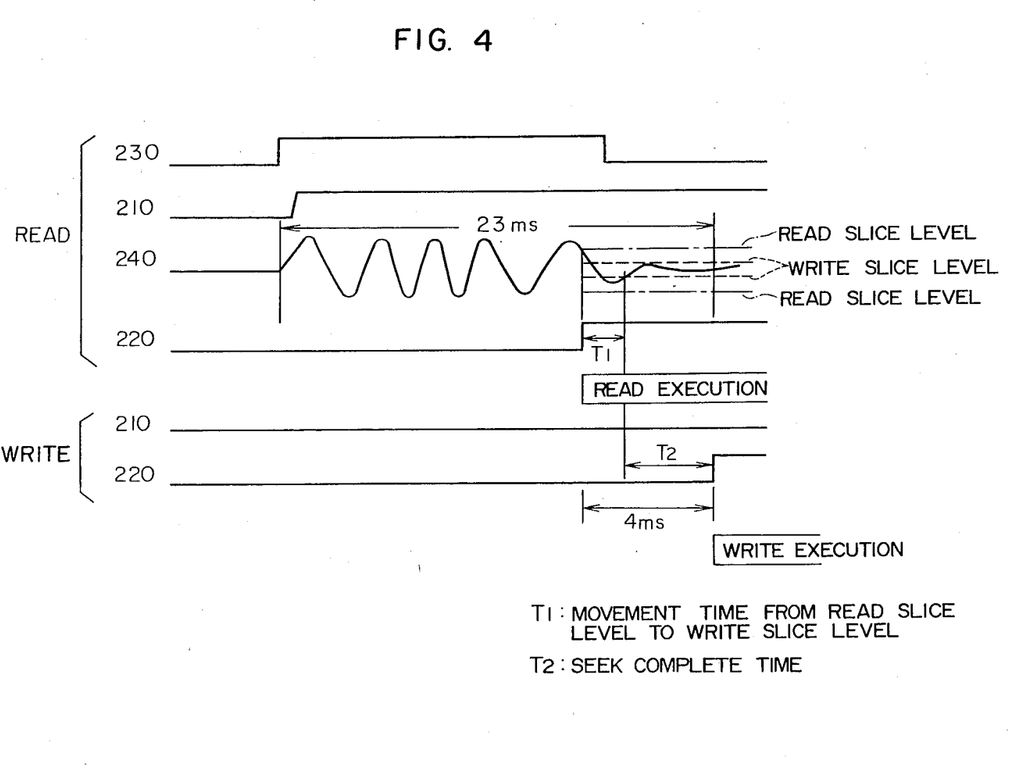
FIG. 4 is a time chart of the system configuration diagram shown in FIG. 3.

The second embodiment will now be described by referring to FIGS. 3 and 4. In accordance with the second embodiment of the present invention, it is detected for the magnetic head to be able to reproduce data from the desired track by monitoring the readout voltage of the magnetic head including the servo head. FIGS. 3 and 4 are a configuration diagram and an operation description diagram of a system including a magnetic disk unit according to the second embodiment of the present invention, respectively.

When a processing unit (CPU) 400 of FIG. 3 issues the data address specifying instruction and the data send/receive instruction toward the magnetic disk unit 100, the disk control unit (DKC) 200 supplies these instructions to a head movement control section 30 within the magnetic disk unit 100. Thereby, the head movement control section 30 drives a voice coil motor (VCM) 101 via a speed control section 40 and a voice coil motor (VCM) amplifier 7 to start the movement of the magnetic head 110 and a servo head 120. Since the magnetic head 110 and the servo head 120 are moved as one body, the following description is centered around the operation and control of the servo head. On the basis of the signal supplied from the above described servo head 120, the speed and position of the servo head 120 are detected by a speed detection section 50 and a position detection section 50 via a preamplifier 80 to be fed back to the head movement control section 30.

The DKC 200 receives the send/receive command succeeding the seek command from the CPU 400 before-hand and decodes it. In case of the data read command, the DKC 200 supplies such a slice control signal 210 as to make the slice level of the position detection signal alternately changing comparatively high to the position detection section 60. That is to say, the DKC 200 causes the position detection section 60 to consider that the head 110 has been on the desired track, even if the overshoot and undershoot are comparatively large although the head 110 is located on the desired track. Thereby, the position detection section 60 issues a seek completion report signal 220 to the DCK 200. Data are thus read out by a magnetic head (not illustrated) via a read/write amplifier 90.

This operation will now be described by referring to the time chart of FIG. 4. At first, the DKC 200 issues a seek command 230 to the head movement control section 30. If the read command is distinguished by the next command analysis, the DKC 200 sends a slice level control signal 210 for raising the slice level of the position detection to the position detection section 60. Even if the position signal 240 vibrates comparatively largely, therefore, the position detection section 60 generates a seek completion report signal 220 to start the read operation. The position offset, namely, the position voltage is defined by the gap width of the desired track width. Accordingly, the slice level is also empirically defined by the gap width.

When the command from the CPU 400 is the write command, the DKC 200 issues the slice level control signal 220 to the position detection section 60 to lower the slice level of the position signal or to narrow the position signal. The write operation is thus started when the overshoot and undershoot of the head have become small. Accordingly, the occurrence of the write error can be prevented.

In the above described two embodiments, the write operation is started when the head has stabilized, and the read operation is started when the head still vibrates in some degree. As a result, the processing time of the whole disk unit can be reduced.

In the second embodiment, the average access time in data read operation can be shortened by $(T_1+T_2)/2$. In general, the value of $(T_1+T_2)$ is approximately 4 msec. If the present invention is applied to a magnetic disk unit operating with an average access time of 23 msec, the average access time becomes $[23-4/2]=21$ msec. That is to say, the improvement of 2 msec (or approximately 9%) is obtained as the effect of applying the present invention. The value of 4 msec is reduced to half on the assumption that the occurrence possibility of the write operation is equal to that of the read operation. In the actual utilization state of the whole system, however, the occurrence possibility of the read operation is often higher than that of the write operation. In this case, therefore, a further significant effect can be expected. In the present embodiment, the recording and reproducing operation is controlled on the basis of the signal reproduced by the servo head. Instead of this, however, the magnetic head for data reproduction may be used.

In accordance with the present invention, data reproduction is started even if the head is unstable only during the data read operation. As a result, the whole processing time can be shortened and the error occurrence can be prevented during the data write operation.

We claim:

1. A recording/reproducing method of an information disk unit effecting data recording/reproducing operation by means of a head on the basis of a seek command and a recording/reproducing command received from a host processor and performing a seek operation, comprising:
    a first step for starting the data reproduction on the basis of said data reproducing command in response to detection of such a state that said head has sought to an extent that the data on the desired track can be marginally reproduced; and
    a second step for starting the data recording on the basis of said data recording command in response to detection of such a state that the position of said head has stabilized on the desired track by means of the seek operation.

2. A recording/reproducing method of an information disk unit according to claim 1, further comprising a step for judging whether the command received from said host processor is the data recording command or the data reproducing command, and for selecting one of said first step and said second step on the basis of the result of said judgment.

3. A recording/reproducing method of an information disk unit according to claim 1, comprising a step for detecting the approach of said head to the desired track, for judging whether the command received from said host processor is the read command or the write command, and for executing the read operation in case of the read command and making said second step executed in case of the write command.

4. A recording/reproducing method of an information disk unit according to claim 3, wherein the approach of the head to the desired track is detected by comparing the readout voltage of a servo head of said disk unit representing the head position with respect to the center of the desired track with a predetermined value.

5. A recording/reproducing method of an information disk unit according to claim 3, wherein after the head has reached the desired track, the readable point and the writable point are detected by counting predetermined time values corresponding to margins with respect to centers of respective tracks.

6. A recording/reproducing method of an information disk unit according to claim 1, wherein said head comprises a magnetic head and said disk unit comprises a magnetic disk unit, and wherein the execution starting instant of the recording/reproducing operation in said recording/reproducing step is defined by the position signal level of the magnetic head.

7. A recording/reproducing method of a magnetic disk unit effecting data recording/reproducing operation by means of a head on the basis of a seek command and a recording/reproducing command received from a host processor, comprising the steps of:
reproducing, in case of the data reproducing command, data upon detection of a reproducible area representing the state that the magnetic head has sought to an extent that the data on the desired track can be marginally reproduced; and
recording, in case of the data recording command, data upon detection of a writable area representing the state that the position of the magnetic head has stabilized on the desired track.

8. A magnetic disk apparatus for recording/reproducing data by means of a magnetic head on the basis of a seek command and a recording/reproducing command received from a host processor, comprising:
detection means for detecting a state that said magnetic head has become able to marginally read out data on the desired track during the execution of the seek command; and
control means for rendering the magnetic head to carry out the data read operation in response to the output of said detection means based on the read command supplied from said host processor, and rendering the write operation executed, based on the write command supplied from said host processor, upon detection of a state that the magnetic head has been stably centered on the desired track.

9. A magnetic disk apparatus according to claim 8, wherein said detection means comprises:
first generation means for generating a head position level signal representing a deviation from the center of the track to be gained access to on the basis of a signal read out from the magnetic head or a servo head interlocked therewith;
second generation means for generating a predetermined level signal corresponding to a readable head position with respect to the track; and
means for detecting a readable instant by comparing the output of said first generating means for generating the position level signal with the output of the second generating means for generating the predetermined level signal.

10. A magnetic disk apparatus according to claim 9, comprising:
third generation means for generating another predetermined level signal corresponding to a writable head position with respect the track, said another predetermined level being smaller than the predetermined level of said first generation means; and
means for detecting the writable instant by comparing the output of said third generation means with the output of said first generation means.

* * * * *

UNITED STATES PATENT AND TRADEMARK OFFICE
CERTIFICATE OF CORRECTION

PATENT NO. : 4,803,572

DATED : February 7, 1989

INVENTOR(S) : Haruna et al

It is certified that error appears in the above-identified patent and that said Letters Patent is hereby corrected as shown below:

[57] ABSTRACT line 7, delete "sought on" and insert --approached--
        insert --such-- after "extent"

Column 1 line 36, insert --a-- after "called"
    line 50, delete "accept" and insert --acceptance--

Column 2 line 10, delete "withotu" and insert --without--

Column 3 line 9, delete "when" and insert --When--

Column 6

(claim 1)

line 58, after "a" insert --data--
    line 61, delete "the" (first occurrence)
    line 64, delete "sought" and insert --approached a desired disk track--; insert --such-- after "extent"; delete "the"; insert --disk-- after "desired"

UNITED STATES PATENT AND TRADEMARK OFFICE
CERTIFICATE OF CORRECTION

PATENT NO. : 4,803,572
DATED : February 7, 1989
INVENTOR(S) : Haruna et al

Page 2 of 4

It is certified that error appears in the above-identified patent and that said Letters Patent is hereby corrected as shown below:

line 65, delete "marginally" and insert --substantially--
    line 66, delete "the" (first occurrence)

Column 7

(claim 1)

line 1, insert --disk-- after "desired"
    line 2, delete "the seek" and insert --a tracking
        control--

(claim 3)

line 12, insert --disk-- after "desired"

(claim 4)

line 20, insert --disk-- after "desired"
    line 23, insert --disk-- after "desired"

(claim 5)

line 27, insert --disk-- after "desired"
    line 30, insert --disk-- after "respective"

(claim 7)

line 41, insert --data-- after "a" (first occurrence)

UNITED STATES PATENT AND TRADEMARK OFFICE
CERTIFICATE OF CORRECTION

PATENT NO. : 4,803,572
DATED : February 7, 1989
INVENTOR(S) : Haruna et al

It is certified that error appears in the above-identified patent and that said Letters Patent is hereby corrected as shown below:

Column 8

(claim 7)

line 1, delete "sought" and insert --approached a desired disk track--; insert --such-- after "extent"; delete "the"; insert --disk-- after "desired"
    line 2, delete "marginally" and insert --substantially--

(claim 8)

line 12, delete "marginally" and insert --substantially--
    line 13, delete "the" (first occurrence) and insert --a--; insert --disk-- after "desired"
    line 22, insert --disk-- after "desired"

(claim 9)

line 27, insert --disk-- after "the" (first occurrence)
    line 32, insert --disk-- after "the"

(claim 10)

UNITED STATES PATENT AND TRADEMARK OFFICE
CERTIFICATE OF CORRECTION

PATENT NO. : 4,803,572
DATED : February 7, 1989
INVENTOR(S) : Toshiyuki Haruna, et al.

It is certified that error appears in the above-indentified patent and that said Letters Patent is hereby corrected as shown below:

Column 8, claim 10, line 5, insert --disk-- after "the".

Signed and Sealed this

Ninth Day of November, 1993

Attest:

BRUCE LEHMAN

Attesting Officer        Commissioner of Patents and Trademarks